US012448954B2

(12) United States Patent
Ullrich

(10) Patent No.: US 12,448,954 B2
(45) Date of Patent: Oct. 21, 2025

(54) BUOYANT FORCE UTILIZATION DEVICE

(71) Applicant: Thomas Ullrich, Berlin (DE)

(72) Inventor: Thomas Ullrich, Berlin (DE)

(*) Notice: Subject to any disclaimer, the term of this patent is extended or adjusted under 35 U.S.C. 154(b) by 0 days.

(21) Appl. No.: 18/704,599

(22) PCT Filed: Oct. 28, 2022

(86) PCT No.: PCT/EP2022/080310
§ 371 (c)(1),
(2) Date: Apr. 25, 2024

(87) PCT Pub. No.: WO2023/073223
PCT Pub. Date: May 4, 2023

(65) Prior Publication Data
US 2024/0328399 A1 Oct. 3, 2024

(30) Foreign Application Priority Data

Oct. 31, 2021 (DE) .......................... 102021128405.8
Nov. 8, 2021 (LU) ........................................ 500836

(51) Int. Cl.
F03G 7/04 (2006.01)
(52) U.S. Cl.
CPC ...................................... F03G 7/04 (2013.01)
(58) Field of Classification Search
CPC .............................................. F03G 7/04
USPC ................................................. 60/495–496
See application file for complete search history.

(56) References Cited

U.S. PATENT DOCUMENTS

| 4,038,826 | A | * | 8/1977 | Shaw | F03B 17/02 60/641.14 |
| 5,125,233 | A | | 6/1992 | Evanger | |
| 6,223,532 | B1 | * | 5/2001 | Brassea-Flores | F03B 17/02 60/671 |
| 6,978,610 | B2 | * | 12/2005 | Carnahan | F25B 9/00 60/645 |
| 8,453,443 | B2 | * | 6/2013 | Kim | F03B 17/02 60/495 |
| 2014/0197642 | A1 | * | 7/2014 | Daya | H02K 53/00 74/DIG. 9 |

FOREIGN PATENT DOCUMENTS

| DE | 9404819 U1 | 7/1994 |
| KR | 20020030848 A | 4/2002 |
| WO | 2014014425 A1 | 1/2014 |

OTHER PUBLICATIONS

IPEA (EPO), International Preliminary Report on Patentability (IPER) for PCT/EP2022/080310, Oct. 17, 2023, (with Demand for international preliminary examination under Art. 34 (3) and (4) PCT for PCT/EP2022/080310, with Annexes, Aug. 30, 2023.).

* cited by examiner

Primary Examiner — Hoang M Nguyen
(74) Attorney, Agent, or Firm — Hemisphere Law, PLLC; Zhigang Ma

(57) ABSTRACT

The invention relates to a buoyancy force utilization device for converting kinetic buoyancy energy and/or potential energy into an electrical and/or mechanical energy, a temperature barrier device and a method for converting thermal energy into electrical energy, wherein the invention utilizes the cyclic lift and fall of a buoyant body within a fluid to provide an electrical energy.

7 Claims, 4 Drawing Sheets

BUOYANT FORCE UTILIZATION DEVICE

TECHNICAL FIELD

The invention relates to a device for converting kinetic buoyancy energy and/or potential energy into electrical and/or mechanical energy, a temperature barrier device, and a method for converting thermal energy into electrical energy.

PRIOR ART

A plurality of devices that aim to utilize the buoyancy energy of at least one usually hollow buoyancy body are known from the prior art. Such a device is also known as a buoyancy power plant.

For example, DE8510493U1 discloses a device in which spherical buoyancy bodies move alternately from a water-filled container to an air-filled container. The spherical buoyancy bodies are connected to each other by a chain. The movement drives wheels connected to a generator. The drawback of this system is inevitable losses due to the inability of the sealing elements to prevent water from escaping.

A similar principle is disclosed in DE2557746A1. Here, buoyancy bodies are arranged on a conveyor belt that drives a generator using wheels. To enable the buoyancy bodies to enter the water-filled container against hydrostatic pressure, the device comprises a pump system that pumps water from a water collection container into a pressurized water chamber at increased pressure. The drawback of this system is that the pump system consumes energy, which minimizes the efficiency of the device.

DE102016010718A1, DE9300674U1, DE202010011168U1, DE102016009649A1, DE102009037452A1, DE4029150A1, DE0022693A1, DE2606160A1 describe further, similar devices that follow the same operating principle. All of these devices share the common feature that the buoyancy bodies are mechanically coupled to each other by means of an element (chain, cord, etc.). This results in the frictional/inertial forces of the buoyancy bodies mounted further back on the connecting element (chain, rope, conveyor belt, etc.) being transferred to buoyancy bodies mounted further forward, thus reducing the efficiency.

WO2003058058A1/DE202004009597U1 discloses a device for utilizing the buoyancy energy of floats. The floats are attached to a rotatable transport device and rotate around an upper and lower turning point. The device also comprises a lock assembly in the lower area, which connects two basins with different liquid levels. The floats run along a chain, although it is not clear how the chain should be guided through the lock to provide a sufficient seal. In addition, energy is required to operate the locks, which reduces the efficiency of the system.

DE102017007471A1 discloses a device for energy generation using buoyant force in a liquid-filled container, wherein the buoyancy bodies are connected to each other with a chain and are guided through two locks. Here, too, it is unclear how the chains should be guided through the locks, wherein the operation of the locks reduces the efficiency of the device.

US20150267677A1 describes an apparatus for permanent energy generation using buoyancy and gravity. This device uses gas-filled buoyancy bodies that are connected to each other. The gas-filled buoyancy bodies enter a liquid-filled space through a lock from below and experience buoyancy. Here, too, the gas-filled buoyancy bodies are connected to each other, which results in additional friction losses that reduce the efficiency of the apparatus.

DE9404819U1 discloses a gravitational motor that uses buoyancy and gravity to provide energy. A power piston circulates in a circle within a tube system and passes through two locks that are intended to prevent the media (air, water) from mixing. In one exemplary embodiment, the power piston moves along guide rails, which are, however, interrupted in the lock area. In addition to operating the locks, energy must also be expended to move pivotable guide parts so that the guide rails in the lock area are closed. Another drawback is that the mechanical susceptibility of the device is increased by additional mechanical components, such as the pivotable guide parts.

DE102014000866A1 discloses a controlled buoyancy system for energy generation, in which gas-tight hollow bodies (balloons) of variable volume are continuously guided through a liquid container by an endless traction means. The balloons are fluid-connected via a hose, so that the gaseous content of the balloon is pressed into the subsequent balloons when passing through an area that compresses the preceding balloon. Here, too, a drawback is that the buoyancy bodies are connected to each other. Furthermore, the buoyancy bodies must be mechanically compressed, which greatly reduces the efficiency.

Devices in which the buoyancy bodies are not mechanically coupled to each other are also known. For example, DE102010015667A1, DE102013009842A1, DE102011003099A1 and DE102010051596A1 disclose devices in which the buoyancy bodies are guided within a tube or chamber system. The drawback here, however, is that the buoyancy bodies must be individually guided through a lock system due to the lack of mechanical coupling, which in turn reduces the efficiency.

DE102006007738A1 discloses a method for converting kinetic energy from materials (buoyancy bodies) into rotational energy to drive generators. Here, too, buoyancy bodies that are not connected to each other are guided through a lock system that must be controlled accordingly, which reduces the efficiency.

KR1020020030848A discloses a device for energy generation using buoyancy and gravity. Buoyancy bodies that are not connected to each other are alternately guided through fluids with different densities. The denser and thus heavier fluid should be pushed against the lighter fluid by its gravity, to ensure the latter has a higher fluid level than the heavier fluid. The buoyancy bodies sinking due to gravity push the front buoyancy bodies into the heavier fluid and then enter the lighter fluid, where they float upward due to the buoyancy. The drawback is that the movement of the buoyancy bodies inevitably leads to mixing of the fluids, which reduces the efficiency.

WO 2014/014425 A1 describes a device for converting thermal energy into electrical energy, wherein the device comprises a liquid reservoir separated into two parts: a first part containing a high-temperature liquid, and a second part containing a low-temperature liquid. Buoyancy bodies, which experience a change in volume and thus different buoyancy depending on the temperature of the first and second parts, drive a structure connected to a generator to generate electricity. The drawback is that the buoyancy bodies, not being connected to each other, move randomly through the first and second parts.

U.S. Pat. No. 5,125,233 A describes an energy conversion device that converts heat into mechanical energy. A liquid is heated or cooled in a first and second line by means of heating and cooling lines. A plurality of balloons connected to each other by an endless belt is alternately guided through the first and second lines. In the heated line, the fluid inside the balloon vaporizes, causing it to experience increased buoyancy. Within the second line and in a cooling bath, the gas condenses back into the fluid, and the process starts all over again. The drawback, however, is that in the heating and cooling lines, heat transfer takes place through a gaseous medium (air), which is a poorer conductor of heat than a liquid such as water.

Furthermore, from the prior art, publications proposing the use of capillary action for the generation of electrical energy are also known. For example, AT520053A1 and JPS5813172A each describe a system of series-connected basins and capillary tube elements, wherein a liquid is intended to be transported from a low basin to a higher basin with the aid of capillary action. However, the drawback of both systems is that the capillary flow is interrupted in the upper basin and thus ceases.

DE10257375A1 describes a system that also utilizes capillary forces, but in which the element surrounding the capillaries is heated to vaporize the water contained in the capillaries. Furthermore, the water is heated before entering the capillaries. A drawback of the system is that gas formation occurs within the capillaries, in turn causing the capillary flow to cease. Additionally, it is not described how the energy required for heating and vaporization is provided.

Problem

The task of the present invention is therefore to provide a buoyant force utilization device for utilizing buoyancy energy that omits mechanical coupling of the buoyancy bodies and, at the same time, a lock system with movable mechanical elements (e.g. flaps, doors). The device should have a higher efficiency than the buoyancy power plants known from the prior art.

Solution

The problem is solved by the subject matters and the methods according to the independent patent claims. Further advantageous embodiments can be found in the dependent claims, the description and the exemplary embodiments.

General Advantages

Since the buoyancy bodies according to the invention are not mechanically coupled to each other, any frictional/inertial forces of downstream connecting elements and downstream buoyancy bodies cannot be transferred to upstream connecting elements and buoyancy bodies, which increases the efficiency.

Furthermore, no connecting elements are necessary due to the lock system according to the invention. This results in fewer components overall, which leads to weight savings and reduced wear.

Further advantages can be found in the description and the exemplary embodiments.

BRIEF DESCRIPTION OF DRAWINGS

FIG. 1 B schematically shows an enlarged close-up of the lock system (1.3) shown in FIG. 1A;

FIG. 1 C schematically shows the view of the sectional plane S-S shown in FIG. 1B;

FIG. 2 B schematically shows an embodiment of a buoyancy body (3.0);

FIG. 2 C schematically shows an embodiment of a buoyancy body (3.0);

FIG. 2 D schematically shows an embodiment of a buoyancy body (3.0) in cross-section;

FIG. 2 E schematically shows an embodiment of a buoyancy body (3.0) in cross-section;

FIG. 3 B schematically shows an embodiment of the buoyancy body (3.0) from Fig. A but contracted;

FIG. 3 C schematically shows an embodiment of an expanded buoyancy body (3.0);

FIG. 3 D schematically shows an embodiment of the buoyancy body (3.0) from Fig. C but contracted;

FIG. 4 B schematically shows an embodiment the invention with heat exchanger (1.7).

DESCRIPTION OF THE INVENTION

Figure 1:
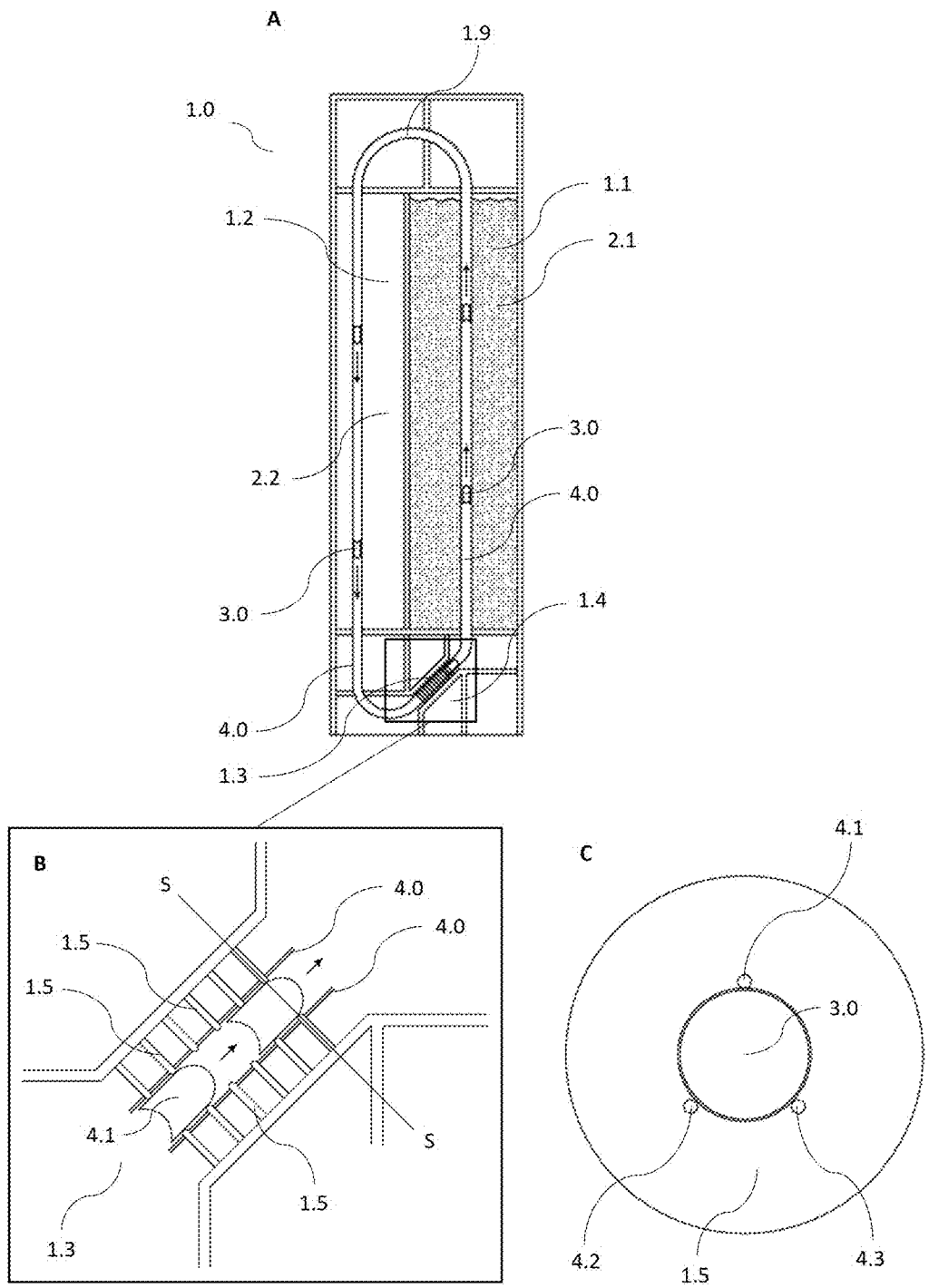
FIG. 1 A schematically shows an embodiment of the invention without heat exchanger (1.7)

The invention comprises a buoyant force utilization device, which is intended to make kinetic buoyancy energy and potential energy useable.

Energy is generally understood to be the ability to perform work, give off heat or emit light. Energy is required when something is to be set in motion, accelerated, lifted, heated or illuminated. The mechanical work (W) is the product of force (F) and the distance travelled(s) by the body performing the work.

According to the invention, kinetic buoyancy energy is thus understood to be the ability to perform mechanical work using the static buoyant force of a body. Static buoyancy is a force opposed to gravity on a body in liquids or gases. Static buoyancy is caused by the displacement of the surrounding medium. The reason for the buoyant force is that the hydrostatic pressure depends on the height of the location under consideration. A higher pressure acts on the underside of the body than on its upper side. The static buoyancy corresponds to the weight of the corresponding displacement of the fluid. This relationship is known as the Archimedes' principle. A buoyant force (FA) thus acts on a body submerged in a fluid with a density (p). This is calculated as the product of the volume (V) of fluid displaced by the body, its density (p) and the acceleration due to gravity (g). The weight (FG) of the displaced fluid and the buoyant force (FA) can therefore be calculated using FA/G=g*p*V. This formula shows that the buoyant force is higher when the fluid is denser and when the volume displaced by the body is greater. However, the weight of the body opposes the buoyant force, so that for maximum buoyancy, an essentially hollow body is preferred, so that the body has a lower average density than the fluid.

Potential energy, or positional energy, enables work to be performed in the direction of acceleration due to gravity. In the Earth's gravitational field, potential energy is the energy that a body has due to its altitude. If a body falls from a height of 20 meters, it can perform twice as much work as if it falls from a height of 10 meters. During the fall, potential energy is converted into kinetic energy or other forms of energy and decreases. In hydroelectric power plants, the potential energy of water in a reservoir can be converted into electrical energy.

According to the invention, the potential energy and/or the kinetic buoyancy energy of a body can be converted into electrical energy and/or mechanical energy. For example, the buoyancy or falling of the buoyancy body can be used to set another body in motion via mechanical coupling. Accordingly, the device according to the invention comprises a converter that is configured to convert the kinetic buoyancy energy into mechanical and/or electrical energy. The converter can be designed as a generator to provide electrical energy. Various embodiments of coupling mechanical elements with generators are known to those skilled in the art.

According to the invention, a body comprises least one buoyancy body, which is movable in a fluid. A fluid can be a liquid (e.g. water, oil) or a gas (e.g. air, hydrogen, helium).

In this context, a space is understood to be an area that comprises a medium defined below. A space can be a defined area (e.g. a container). A space can also be an undefined area (e.g. a marine or limnic system such as a sea or lake).

The device according to the invention comprises at least one first space filled with a first medium, wherein the first medium comprises a fluid, and at least one second space filled with a second medium, wherein the second medium comprises a fluid. In a preferred embodiment of the invention, the first medium has a greater average density than the second medium, and the second medium has a lower average density than the buoyancy body.

According to one embodiment of the buoyant force utilization device, the purpose of the buoyant force utilization device is to utilize and convert kinetic buoyancy energy and potential energy into mechanical and/or electrical energy, wherein the device comprises as components a first space filled with a first medium, a second space filled with a second medium, at least one buoyancy body and a circumferential guide, wherein movement of at least one buoyancy body takes place along the circumferential guide, wherein the average density of the first medium is greater than that of the second medium, wherein the circumferential guide runs through the first space and the second space, wherein the circumferential guide comprises an endless rail system, wherein the first space and the second space are separated from each other at at least one point by a lock system, wherein the lock system has a permanent opening, wherein the opening of the lock system is designed to fit exactly to the smallest lateral cross-section of the buoyancy body.

In particular, the invention relates to a buoyant force utilization device for utilizing and converting kinetic buoyancy energy and/or potential energy into mechanical and/or electrical energy, wherein the device comprises as components a first space filled with a first medium, a second space filled with a second medium, at least one buoyancy body and a circumferential guide, wherein movement of at least one buoyancy body takes place along the circumferential guide, wherein the circumferential guide runs through the first space and the second space, wherein the circumferential guide preferably comprises an endless rail system, wherein the first space and the second space are separated from each other at at least one point by a lock system, wherein the lock system has a permanent opening, wherein the buoyancy body is designed such that its average density and its buoyancy as described herein are dependent on a temperature, wherein the temperature of the first medium and the second medium differs, wherein the device is configured such that an external energy source induces the change in temperature in the first and/or second space, wherein the first medium is arranged in the first space and the second medium is arranged in the second space.

In one embodiment, the temperature of the first medium differs from that of the second medium by at least 5 K, preferably at least by 10 K, particularly preferably by at least 15 K, very particularly preferably by at least 20 K, more preferably by at least 25 K and even more particularly preferably by 30 K.

A change in temperature can be achieved by supplying or dissipating heat from the first and/or second space. The change in temperature is preferably induced by an external energy source. An external energy source may be a device that dissipates thermal energy (e.g. combustion system, solar panel). A geothermal process may also be included in an energy source.

In particular, the average density of the first medium may also be lower than the average density of the second medium, wherein the density is induced by a heat exchanger described below. For example, the density of the first medium decreases relative to the second medium if the media as specified below have the same chemical structure and the heat exchanger causes a change in temperature in the first medium but not in the second medium. In particular, the change in temperature in the first and/or second space due to the configuration of the buoyancy body causes a change in the density and buoyancy of the buoyancy body, depending on the space in which the buoyancy body is located. The average density and the buoyancy of the buoyancy body depend on which space the buoyancy body moves through. This is described in more detail below.

According to a particularly preferred embodiment, the average density of the buoyancy body decreases or increases as the temperature increases. Preferably, the average density of the buoyancy body decreases as described herein.

In a particularly preferred embodiment, both spaces comprise a circumferential guide. This is understood to be a limitation that restricts the movement of the buoyancy body in two out of three dimensions. It is particularly preferred that the movement and lateral extension of the buoyancy body along the endless rail system are limited by an endless rail system.

Essentially, the buoyancy body can be moved away from the center of the Earth by buoyancy and toward the center of the Earth by falling. At least two reversal points are necessary to allow the upward movement to be changed to a downward movement, i.e. toward the center of the Earth, and vice versa, wherein the invention comprises an upper reversal point and a lower reversal point. According to the invention, a change from an upward movement of the buoyancy body to a downward movement of the buoyancy body takes place at the upper reversal point. The change from a downward movement to an upward movement of the buoyancy body takes place at the lower reversal point.

According to one embodiment, the endless rail system comprises a lower reversal point and an upper reversal point. In particular, at least one of the reversal points, preferably the upper reversal point, is designed such that the endless rail system can be interrupted or opened at this point. Removal of buoyancy bodies from and insertion of buoyancy bodies into the endless rail system can be advantageously achieved in this way.

The orientation of the device can be described within a Cartesian coordinate system. The negative z-axis points toward the center of the Earth, while the positive z-axis points away from it. The terms "lower" or "below" and "upper" or "above" refer to the spatial position of an object within the Cartesian coordinate system, wherein a lower position is closer to the center of the Earth than an upper position.

The circumferential guide runs through the first and second spaces and comprises an endless rail system, which is designed such that at least one buoyancy body can be guided in it. The endless rail system can be designed such that at least two parallel guide rails extend parallel to the z-axis through the first and second spaces. A curvature of the guide rails is required at the transition from the first to the second space, and from the second to the first space, which is why the guide rails in this area do not run parallel to the z-axis. The curvature of the guide rails must be designed such that a buoyancy body can be guided in them with minimal friction. The use of an endless rail system offers the advantage that a buoyancy body can be continuously moved through it. In addition, the endless rail system is wear-free, since no moving parts are involved.

In particular, the endless rail system is designed such that the lateral extension of the buoyancy body's movement along the endless rail system is limited. Movement of the buoyancy body along a defined path through the first and second spaces can be advantageously achieved in this way. The endless rail system can be designed such that the buoyancy body does not move through the first and/or second space in a straight line, but instead follows a wave-like pattern, for example. An increase in the residence time of the buoyancy body in the first and/or second space can be advantageously achieved in this way to extend the time that the buoyancy body spends absorbing and/or releasing heat from or to the first and/or second medium.

The buoyancy body may comprise friction-reducing elements to enable it to move within the endless rail system with minimal friction. For example, a friction-reducing element may be made of a low-friction plastic such as polytetrafluorethylene (PTFE). The friction-reducing element makes contact with the guide rail and advantageously allows the buoyancy body to slide through the endless rail system with minimal friction. Furthermore, the endless rail system may also comprise wheel or roller elements that space the hollow body from the endless rail system and reduce friction.

The first and second spaces may be separated from each other by at least one additional third space (also: transition area), wherein the third space comprises a lock system. The lock system is preferably located at the lower reversal point. In one embodiment of the invention, the opening of the lock system is designed to fit exactly to the smallest lateral cross-section of the buoyancy body.

According to a preferred embodiment, the lock system is arranged at the lower reversal point between the first space and the second space. The lock system may also be arranged at the upper reversal point or at both the upper and the lower reversal points. The temperature barrier described below being formed at the upper and lower reversal points can be advantageously achieved in this way and thus prevent temperature equalization of the medium in the first and second spaces, which improves the efficiency of the device.

According to a preferred embodiment, the buoyancy body alternately moves from the first space to the second space and moves, at least in a transition area between the first space and the second space, though the lock system, and in particular through an opening encompassed by the lock system as described herein.

According to one embodiment, the lock system is designed such that the buoyancy body can be continuously moved through it. The continuous movement advantageously allows for uninterrupted movement of the buoyancy body through the lock system without the use of moving parts such as lock doors.

In a further embodiment of the invention, the lock system comprises at least one sealing element, which can be designed as a lip seal, for example.

According to the invention, the sealing element is designed to fit exactly to the smallest lateral cross-section of the buoyancy body, so that it can be passed through it exactly. If the buoyancy body is cylindrical in shape, the smallest lateral cross-section is perpendicular to the lateral surface of the cylinder. If the buoyancy body is spherical in shape, the smallest lateral cross-section corresponds to the largest diameter (or the great circle) of the spherical shape.

"Fit exactly" is understood to mean that the buoyancy body can move through the lock without hindrance and, advantageously, that the buoyancy body does not jam within the lock.

Several sealing elements can also be connected in series. Those skilled in the art select the number of sealing elements, their dimensions and their material in such a way as to enable low-friction movement of the buoyancy bodies through them.

According to the invention, the endless rail system is interrupted in the physical sense by at least one sealing element. However, since guide rails are also arranged between the sealing elements and continuous movement of the buoyancy body takes place through them, the endless rail system should continue to be referred to as such, although the term "discontinuous rail system" would be more appropriate.

In contrast to systems described in the prior art, the lock system has a permanent opening, which means that the first and second spaces are not separated by a lock system with gates or flaps. A permanent opening and the absence of a lock system with movable mechanical parts advantageously allows for low-wear operation of the device according to the invention. In addition, no energy needs to be expended to open or close the lock.

For the buoyancy body to rise within a fluid, its average specific density must be lower than that of the fluid surrounding the buoyancy body. The buoyancy body is preferably designed as a hollow body, wherein the material of the hollow body comprises a metal (e.g. aluminum, stainless steel), a preferably thermoplastic material such as polyethylene (PE), polypropylene (PP), polyvinyl chloride (PVC), polyvinylidene fluoride (PVDF), polytetrafluorethylene (PTFE), glass, an organic material (e.g. wood), or a semi-synthetic plastic. Furthermore, the material of the hollow body may also comprise glass fiber-reinforced plastics (GFRPs).

The buoyancy body is preferably designed such that it can easily absorb and release thermal energy.

In one embodiment, the average density of the buoyancy body and thus its buoyancy depend on a change in temperature. For this purpose, the buoyancy body comprises a temperature-variable medium and/or a technical element whose spatial expansion depends on a change in temperature. The volume, the average density and thus the buoyancy of the buoyancy body can be influenced by the variability of the spatial expansion. According to the invention, a "change in temperature" is understood to mean a reduction in temperature and preferably an increase in temperature.

The interior of the hollow body may comprise as a temperature-variable medium a gas and/or a polymer whose expansion influences the average density of the hollow body. For example, a gas that changes its expansion depending on the temperature of the fluid can be used. The hollow body may be at least partially flexible, so that the expansion of the gas causes an increase in the volume of the buoyancy body and thus its buoyancy.

In particular, the average density of the buoyancy body can be influenced by the expansion of the gas and/or the polymer, wherein the expansion of the gas and/or the polymer depends on a change in temperature in the first and/or second space. The change in temperature causes the medium contained in the first or second space to become colder or, preferably, warmer. The buoyancy body can thus absorb heat in the warmer space and release it again in the colder space. A reduced buoyancy container volume can reduce the buoyancy, and an increased volume can increase the buoyancy. It should be understood here that the space containing the warmer of the media can also be referred to as the "warm space".

According to an advantageous design, the buoyancy body moves downward in the warmer space, since its volume decreases with heat. The buoyancy is thus reduced both by the warmer medium surrounding the buoyancy body and by the buoyancy body's smaller volume. This results in the downward weight being greater than the buoyant force. This has the advantage of supporting the downward movement of the buoyancy body. The larger buoyancy body volume in the colder space supports the upward movement and vice versa.

A preferred embodiment provides that the buoyancy body expands when heated and moves upward in the warmer space. Preferably, the materials that the buoyancy body is formed from are selected such that the increase in buoyancy due to the larger buoyancy body volume outweighs the effect of reduced buoyancy due to the warmer medium.

In one embodiment, the buoyancy body is designed as a hollow body, in the center of which at least one lifting cylinder comprising the interior of the hollow body is arranged. The lifting cylinder can move back and forth relative to the hollow body in the direction of the longitudinal axis of the lifting cylinder, wherein the movement is caused by the temperature-dependent expansion of the temperature-variable medium contained in the interior. This type of embodiment of the buoyancy body allows the buoyancy body to move precisely through the lock system if the opening of the lock system fits exactly to the smallest lateral cross-section of the buoyancy body. For example, the hollow body can be cylindrical in shape, wherein the diameter of the opening of the lock system corresponds exactly to the outer diameter of the hollow body. Forward and backward movement of the lifting cylinder can be advantageously achieved in this way, without being limited by the dimensions of the opening of the lock system. In other words, the movement of the lifting cylinder occurs parallel to the movement of the buoyancy body through the endless rail system.

By precisely designing the opening of the lock system, the lock system forming a barrier in conjunction with the buoyancy body can be advantageously achieved, preventing the media of the first and second spaces from mixing. In particular, the functional connection enables a temperature barrier that prevents the temperatures of the media contained in the first and second spaces from equalizing. Preferably, the material that the buoyancy body is at least partly formed from comprises a material that is a poor conductor of heat or an insulating material (with a coefficient of thermal conductivity as defined below), such as a plastic or wood as defined herein.

It goes without saying that if the buoyancy body is to function as an insulating element within the temperature barrier, it must, on the one hand, be designed such that it prevents heat transfer from the warmer space to the colder space and, on the other hand, be designed such that it is capable of absorbing or releasing thermal energy in a short period of time (e.g. within 5 minutes) to change its average density as described herein. This can be achieved, for example, by making the buoyancy body cylindrical in shape, wherein the end faces of the cylinder are formed from a material with poor thermal conductivity, whereas the lateral surface of the cylinder is formed from a material with good thermal conductivity and a coefficient of thermal conductivity of at least 20 $Wm^{-1}K^{-1}$, preferably of at least 50 $Wm^{-1}K^{-1}$, particularly preferably of at least 100 $Wm^{-1}K^{-1}$, very particularly preferably of at least 200 $Wm{-1}\,K{-1}$, and more preferably of at least 300 $Wm^{-1}K^{-1}$ and even more particularly preferably of at least 400 $Wm^{-1}K^{-1}$. For example, the lateral surface of the cylinder may comprise copper as a material with good thermal conductivity. The use of copper is particularly advantageous, as it is a common and inexpensive material.

The purpose of the temperature barrier is thus to thermally decouple the first and second spaces from each other and, in particular, to thermally decouple the first and second media from each other. In particular if the first and second media are chemically identical, the lock system or the temperature barrier can be designed such that smaller leaks, i.e. transfer of the first medium to the second or the second medium to the first, are possible. Care must be taken to ensure that the leaks are only large enough that the efficiency of the device is only insignificantly influenced or reduced by media transfer, in particular heat exchange of the media, so that this preferably causes a change in temperature of preferably less than 1 K per hour, particularly preferably less than 0.5 K per hour and very particularly preferably less than 0.1 K per hour. The thermal decoupling according to the invention is therefore not to be understood as absolute, but rather the insulation of the first medium from the second medium caused by the thermal decoupling depends largely on how wide the gap between the buoyancy body and the lock system is. The area of the gap between the buoyancy body and the lock system preferably corresponds to a maximum of 5%, preferably a maximum of 2% and particularly preferably a maximum of 1% of the area of the opening of the lock system.

The advantage of a smaller gap area is that it reduces leakage of the media into each other and better enhances thermal decoupling.

Additionally, equalizing the filing levels of the first and second spaces further prevents the media from transitioning into each other.

Of course, the material that the endless rail system is formed from, at least in the area around the lock, should also comprise a material with poor thermal conductivity, preferably with a coefficient of thermal conductivity of no more than 1 $Wm^{-1}K^{-1}$, preferably no more than 0.5 $Wm^{-1}K^{-1}$ and particularly preferably no more than 0.01 $Wm^{-1}K^{-1}$ (e.g. a ceramic, in particular a ceramic coated with a friction-reducing element, or a plastic), to prevent heat transfer from the first to the second space or vice versa through the endless rail system.

In particular, the invention comprises a temperature barrier device for thermally decoupling a first space from a second space or for thermally decoupling a first medium from a second medium, wherein the device comprises a lock system and a buoyancy body, wherein the lock system and the buoyancy body are functionally connected such that the first medium cannot cross into the second medium or vice versa. The prevention of such crossover is not considered to be an absolute concept here. Those skilled in the art preferably select the gap between the buoyancy body and the lock system so as to only allow a small amount of medium to cross over into the other on the one hand, and so as not to significantly influence the movement of the buoyancy body on the other. Those skilled in the art must therefore design the temperature barrier device in such a way as to ensure that the buoyancy body slides through the lock system with minimal friction and minimal media crossover.

The invention further comprises a temperature barrier device for thermally decoupling a first space from a second space or for thermally decoupling a first medium from a second medium, wherein the device comprises a lock system with at least one opening and a buoyancy body, wherein the lock system and the buoyancy body are designed such that the buoyancy body can pass through the opening of the lock system, wherein at least one sealing element in contact with the buoyancy body, preferably exactly fitting against the buoyancy body, is arranged at the opening of the lock system to prevent the first medium from crossing into the second medium or vice versa and/or to prevent a temperature exchange between the first and second medium. The buoyancy body is preferably configured such that it is thermally insulating in the direction from the first to the second space or from the second to the first space, as described above, thereby preventing heat transfer from the warmer to the colder medium. In a further development, the buoyancy body is configured for efficient heat absorption, in addition to providing thermal insulation between the spaces or media.

The direction from the first to the second space or from the second to the first space is to be understood as the direction of heat absorption from the warmer to the colder medium.

The opening of the lock system can be designed as described herein, so that the opening fits exactly against the buoyancy body, or that the gap is designed as described above.

Media crossover can be prevented particularly effectively if the lock system is designed such that it rests flexibly against the buoyancy body, e.g. using flexible lips. Furthermore, the lock system is preferably designed such that the sealing element is also at least partially made of a material with poor thermal conductivity (e.g. a plastic).

It is also conceivable that the interior of the hollow body comprises as a technical element a thermoresponsive polymer that changes its volume depending on the temperature of the fluid. Shape memory polymers are also conceivable to influence the volume of the buoyancy body. For example, shape memory polymers (e.g. polylactic acid) that return to their original shape when exposed to temperature are known to those skilled in the art. A buoyancy body could, for example, be designed such that a spring element or a pneumatic element is arranged in its interior between two opposite walls and pushes them and a shape memory polymer element apart to increase the volume of the buoyancy body. A shape memory polymer element, which contracts under the influence of temperature, can be arranged parallel to the spring lengthwise and counteract the outward force of the spring to reduce the volume of the buoyancy body and thus the specific buoyancy. Alternatively, the interior of the hollow body can be designed with a foamed shape memory polymer to change the average density of the buoyancy body depending on temperature.

In an alternative embodiment, the buoyancy body comprises at least one element made of a shape memory metal. The material of a shape memory metal comprises nitinol, for example. A shape memory metal can, for example, be designed as a spiral and be arranged so that it is functionally connected to a spring element or pneumatic element within the buoyancy body, as described above, so that the spiral made of the shape memory metal contracts when the buoyancy body heats up, counteracts the force of the spring element or pneumatic element and consequently reduces the volume of the buoyancy body. The use of a shape memory metal advantageously results in less wear-intensive use of the buoyancy bodies.

Embodiments in which at least one element made of a shape memory metal and at least one element made of a shape memory polymer are combined are also conceivable.

In a further embodiment, a polymer mesh made of a shape memory polymer envelopes the buoyancy body. The buoyancy body may contain a gas that pushes the walls of the buoyancy body outward, either depending on or independently of the temperature. The polymer mesh may contract when the temperature rises and reduce the volume of the buoyancy body and thus increase its average density. To separate the polymer mesh from the surrounding fluid, it can be sealed with a further—and flexible—layer or separated from the surrounding fluid by a sheath. The advantage of this is that the polymer mesh can be heated or cooled more quickly.

Furthermore, shape memory polymers that change their shape depending on light are also conceivable. For example, light-dependent polymers that are ionized by exposure to light, creating an internal osmotic pressure that causes the polymer to swell, are known from the prior art. The gel collapses as soon as exposure to light is discontinued. In particular in an embodiment that uses a light-dependent polymer, it is advantageous if the buoyancy body comprises glass or another transparent material so that the light can penetrate through the outer wall of the buoyancy body to reach the light-dependent polymer behind it.

Combinations of all the embodiments described above are also conceivable. For example, in one embodiment, the outer polymer mesh can be combined with a spring element and/or a shape memory metal element and/or a shape memory polymer element located within the buoyancy body. In further embodiments, shape memory polymers that expand as the temperature increases can be used.

To enable a temperature-dependent change in the volume of the buoyancy body, the buoyancy body must be exposed to a different temperature in the first space than in the second space. Those skilled in the art can determine the necessary difference in temperature depending on the materials used for the buoyancy body, in particular the shape memory metals or shape memory polymers, and provide this, for example, by means of a heat exchanger or heating element. In this respect, the thermal energy provided can be converted into buoyancy energy and consequently into mechanical and/or electrical energy. In particular, the heat exchanger can use the external energy source to provide the amount of heat necessary to heat the first and/or second space.

Since even small differences in temperature between the first and second spaces are sufficient for the function of the shape memory polymer or shape memory metal described above, the buoyant force utilization device can be operated with low thermal energy inputs. The advantage of this is that changes in temperature from processes with only a small heat output can be utilized. For example, it is conceivable that the waste heat from a biological process (e.g. fermentation in a biogas plant) is fed into at least the first and/or second space to bring about a change in temperature therein. Biogas plants are often operated in the mesophilic (20-45°

C.) or thermophilic (>50° C.) range. Alternatively, the waste heat from a combustion process can operate the device according to the invention.

According to one embodiment, the buoyancy body comprises at least one profiling, which is configured to engage in the guide rails to stabilize the buoyancy body. The profiling may comprise a friction-reducing element as described above.

According to one embodiment, the surface of the buoyancy body facing the first and/or second medium comprises a profiling. In particular, the surface of the buoyancy body facing the first and/or second medium is designed as a profiling, which allows the endless rail system to be continuously guided through the opening of the lock system, thereby eliminating the need to interrupt the endless rail system.

The shape of the buoyancy body can be essentially cylindrical, elliptical, conical, spherical, pyriform and/or streamlined, wherein combinations thereof are also conceivable. Since the buoyancy body moves, in at least one of the first and/or second space, in a fluid whose average density is greater than that of the buoyancy body, a streamlined shape of the buoyancy body is preferred. Furthermore, a higher hydrostatic pressure acts on the underside of a buoyancy body than on its upper side, which is the reason for its buoyancy. In this respect, an essentially conical shape of the buoyancy body is preferred. Those skilled in the art can select the exact shape and size of the buoyancy bodies depending on the fluids and materials used.

In one embodiment, the movement of the buoyancy body, in the second space in particular, can be influenced by gravity. This should be understood to mean that the buoyancy body in the first space moves upward against the force of gravity due to buoyancy in a fluid contained therein. After the buoyancy body has passed a reversal point, it enters the second space, in which the fluid has a lower average density than that of the buoyancy body. The buoyancy body can therefore follow (also: fall under) the force of gravity in the second space and perform work along the distance travelled by converting the potential energy, as described above, into electrical or mechanical energy by means of a converter.

In a further embodiment, a buoyancy body comprises at least one magnetic element, wherein at least one coil is arranged along the endless rail system around the latter. During both buoyancy and descent, the buoyancy body thus moves through the coil and can induce an electric current therein that can be picked up.

According to one particularly preferred embodiment, the device comprises a heat exchanger and/or a heating element to induce a change in temperature at least in the first and/or in the second space. The heat exchanger preferably causes a change in temperature in only one of the spaces, e.g. in the first space. This change in temperature, preferably an increase in temperature, causes an increase in the temperature of the buoyancy body and thus a reduction in the average density of the buoyancy body, generating increased buoyancy compared to a non-heated buoyancy body. The heated buoyancy body then rises within the heated space until it returns to the second space at the upper reversal point. The temperature in the second space is preferably lower than in the first space, as a result of which the average density of the buoyancy body changes again and it sinks until it reaches the lower reversal point, is again exposed to the increased temperature of the first space, and the process repeats.

The change in temperature caused by a heat exchanger or a heating element preferably takes place in the immediate vicinity of the lower or upper reversal point and/or in the immediate vicinity of the buoyancy body, wherein the positioning and the distance of the heat exchanger or the heating element from the buoyancy body can be determined by those skilled in the art. The positioning and distance should be chosen so that the most efficient change in temperature of the buoyancy body is induced and, at the same time, it is ensured that a change in temperature in the first or second space does not cause or only insignificantly causes a change in temperature in the second or first space, depending on which of the spaces the heat exchanger is located in. It goes without saying that the first and/or second space must comprise insulating elements to limit the change in temperature to a specific range.

To induce a change in temperature in the first or second space, one embodiment of the invention comprises a heat exchanger comprising a primary and a secondary circuit, wherein the two circuits are not fluid-connected to each other. The heat exchanger can be arranged within the first space, wherein the secondary circuit comprises the medium of the first space, while the primary circuit of the heat exchanger carries a third medium/fluid that carries the waste heat of a heat-generating biological process (e.g. fermentation), and/or a physical process (e.g. solar heat), and/or a chemical process (e.g. combustion). In an alternative embodiment, the heat exchanger can also be arranged in the second space. Furthermore, it is conceivable that the heat exchanger induces a reduction in temperature in the first and/or second space by having its primary circuit carry a fluid that is colder than the buoyancy body.

According to one embodiment, the primary circuit comprises a third medium that has a higher temperature than the first medium of the first space, wherein the third medium cannot be fluid-connected to the first medium. The third medium can be a fluid that has a boiling point at least twice as high as that of the first or second medium. For example, the third medium can be a liquid salt. The use of a third medium advantageously allows for more effective heating of the first and/or second medium.

In one embodiment of the invention, a heat exchanger is omitted, wherein at least one of the spaces is designed such that the first and/or second medium can be replaced by a medium with a different temperature. For example, it is conceivable that, instead of a heat exchanger, the first and/or second medium is passed through the first and/or second space, preferably the first medium is channeled through the first space. The first and/or second medium is supplied from the outside, i.e. from outside the first and/or second space, and is also discharged back to the outside. The construction of a heat exchanger can thus be advantageously omitted. The first or second medium channeled through may, for example, be water from a cooling circuit or water used to dissipate waste heat.

In one embodiment, the first medium is heated by geothermal processes and fed into the first space to heat the buoyancy bodies there, while the second medium, which is cooler, preferably at least 20 K cooler, particularly preferably at least 30 K cooler, and very particularly preferably at least 40 K cooler than the first medium, is fed through the second space to cool the buoyancy bodies there. In a further embodiment, the device is designed such that the second medium, after passing through the second space, is fed into a device that serves to heat the second medium, for example by geothermal processes, and the second medium is then fed into the first space, where it transfers the thermal energy to the buoyancy bodies.

According to an advantageous embodiment, a heat exchanger also carries a third medium, which is designed as a coolant, to reduce the temperature in the first and/or second space. Alternatively, a coolant can flow through the first and/or second space, preferably only one of the two, so that buoyancy bodies located in the space are cooled.

In one embodiment of the invention, the first and second media have the same chemical structure. For example, the first and second spaces may contain water or oil. The buoyancy body can move through both spaces, wherein the transition areas are also fluid-connected to the first and second spaces. A lock system that prevents or impedes heat diffusion from the first to the second space can be arranged between the first and second spaces. The advantage of this is that the buoyancy body is only exposed to a maximum change in temperature in the designated space to influence the volume and thus the buoyancy of the buoyancy body. In an alternative embodiment, a lock system can be omitted.

In a further embodiment, the primary circuit, i.e. the third medium, of the heat exchanger carries the waste heat from a solar panel or another waste heat-producing process described above, wherein the temperature of the third medium is variable.

The invention relates to a method of using the buoyant force utilization device comprising moving the buoyancy body in a first space by buoyancy and moving the buoyancy body in a second space by gravity, wherein movement of the buoyancy body takes place along an endless rail system.

In particular, the invention relates to a method for operating a buoyant force utilization device and converting thermal energy into electrical and/or mechanical energy, wherein the method provides a first space and a second space and at least one buoyancy body, a first medium and a second medium, a heat exchanger, an endless rail system, and a converter configured to convert the kinetic energy of the buoyancy body into electrical energy. The method comprises converting the thermal energy introduced into the first and/or second space by the heat exchanger into electrical energy. This is achieved by influencing the average density of the buoyancy body by means of the heat energy input as described above.

Furthermore, the invention relates to a method for operating a buoyant force utilization device and for converting thermal energy into electrical energy, comprising the steps of providing a first space and a second space and at least one buoyancy body, a first medium and a second medium, a heat exchanger, an endless rail system, and a converter configured to convert the kinetic energy of the buoyancy body, caused by its buoyancy, into electrical energy, wherein the movement of the buoyancy body takes place along an endless rail system, wherein thermal energy input into the first and/or second space is provided by the heat exchanger, wherein the average density of the buoyancy body, as described herein, is influenced by the thermal energy input.

In addition, the invention relates to a method for converting thermal energy into electrical energy and comprises the provision of a buoyant force utilization device defined herein, a converter that is configured to convert the kinetic energy of the buoyancy body, in particular from movement caused due to the buoyancy of the buoyancy body, into electrical energy, wherein movement, in particular movement guided by the endless rail system, of the buoyancy body takes place along the endless rail system, wherein a difference in temperature between the first and second spaces is induced by the heat exchanger, wherein the average density and the buoyancy of the buoyancy body are increased or decreased by the difference in temperature, wherein the buoyancy body executes a movement, preferably a movement along the endless rail system, in the first and second space depending on its average density, wherein the movement is converted into electrical energy by the converter.

The thermal energy is preferably input into the first space. However, thermal energy can also be input into the second space instead of the first space. Due to thermal energy input into at least one of the media, preferably only one of the media, i.e. the first medium or the second medium, more preferably the first medium, the buoyancy body is heated and consequently changes its average density, as described herein. The buoyancy body alternately moves from the first to the second space, wherein the difference in temperature between the spaces, in particular between the media contained in them, is at least greater than 5 K, preferably greater than 10 K, particularly preferably greater than 20 K, very particularly preferably greater than 30 K and more preferably greater than 40 K. A larger difference in temperature advantageously accompanies more efficient cooling or heating of the buoyancy body.

In one embodiment of the method, the thermal energy input into the first and/or second space is provided by geothermal processes and/or solar thermal processes and/or waste heat-producing processes, or further processes described herein.

EXEMPLARY EMBODIMENTS

The present invention is explained in greater detail with reference to the following figures and exemplary embodiments, without limiting the invention thereto.

In the various figures, parts of equivalent function are always designated by the same reference numerals, so that they are generally described only once.

FIG. 1A-C shows an embodiment of the buoyancy force utilization device (1.0), which comprises a first chamber (1.1) filled with a first medium (2.1) (here: water) and a second chamber (1.2) filled with a second medium (2.2) (here: air). Furthermore, the device comprises buoyancy bodies (3.0), which can be guided within a circumferential guide (4.0), which is designed as an endless rail system. The first space (1.1) and the second space (1.2) are separated from each other by a lock system (1.3), whereby this is arranged at the lower reversal point (1.4). The lock system (1.3) shown enlarged in FIG. 1B comprises several lip seals (1.5) connected in series, the inside diameter of which is designed to fit the cross-section of the buoyancy bodies (3.0) exactly. The buoyancy bodies (3.0) are manufactured as hollow bodies made of polyethylene and coated with polytetrafluoroethylene so that the buoyancy bodies (3.0) can be guided through the endless rail system (4.0) with as little friction as possible. Not shown converters are arranged along the endless rail system (4.0), which convert the kinetic energy of the buoyancy bodies (3.0) into electrical energy during ascent in the first space (1.1) and also during fall in the second space (1.2). FIG. 1C shows the view of the sectional plane S-S shown in FIG. 1B. The circumferential guide (4.0) here comprises a first guide rail (4.1), a second guide rail (4.2) and a third guide rail (4.3), whereby the guide rails are arranged at an angle of 120° to each other. The inside diameter of the lip seal (1.5) is designed to fit the cross-section of the buoyancy body (3.0) exactly, so that advantageously no first medium (2.1) can penetrate between the buoyancy body (3.0) and the lip seal (1.5). The guide rails (4.1, 4.2, 4.3) stabilize the lip seal on the one hand and on the other hand serve to continuously guide the buoyancy body (3.0) through the circumferential guide (4.0). Alternatively, only two guide rails can be used, which are arranged at a 180° angle to each other.

Figure 2:
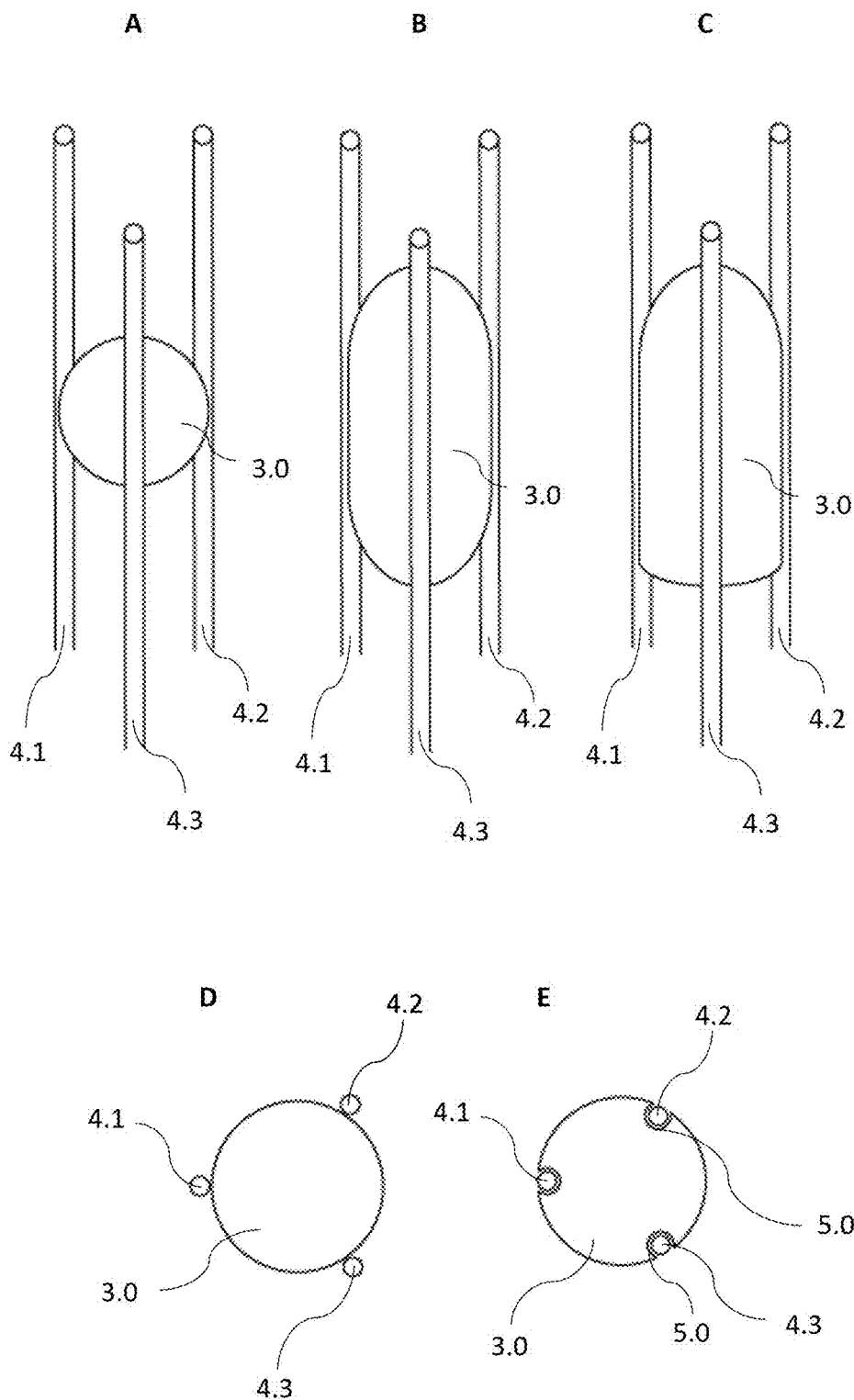
FIG. 2 A schematically shows an embodiment of a buoyancy body (3.0)

FIG. 2A, FIG. 2B and FIG. 2C each show an embodiment of a buoyancy body (3.0), which essentially has a circular profile in cross-section. The buoyancy body (3.0) is arranged within three guide rails (4.1, 4.2, 4.3), so that the buoyancy body (3.0) is only movable in the longitudinal direction of the guide rails (4.1, 4.2, 4.3). FIG. 2D shows the buoyancy body (3.0) depicted in FIG. 2B with the guide rails (4.1, 4.2, 4.3), wherein they are arranged at an angle of 120° to each other. FIG. 2E shows a modified embodiment thereof, wherein the outside of the buoyancy body (3.0) is designed such that it has profiling (5.0) into which the guide rails (4.1, 4.2, 4.3) are guided to engage. This profiling is advantageous in that it prevents the buoyancy body (3.0) from rotating around its longitudinal axis.

Figure 3:
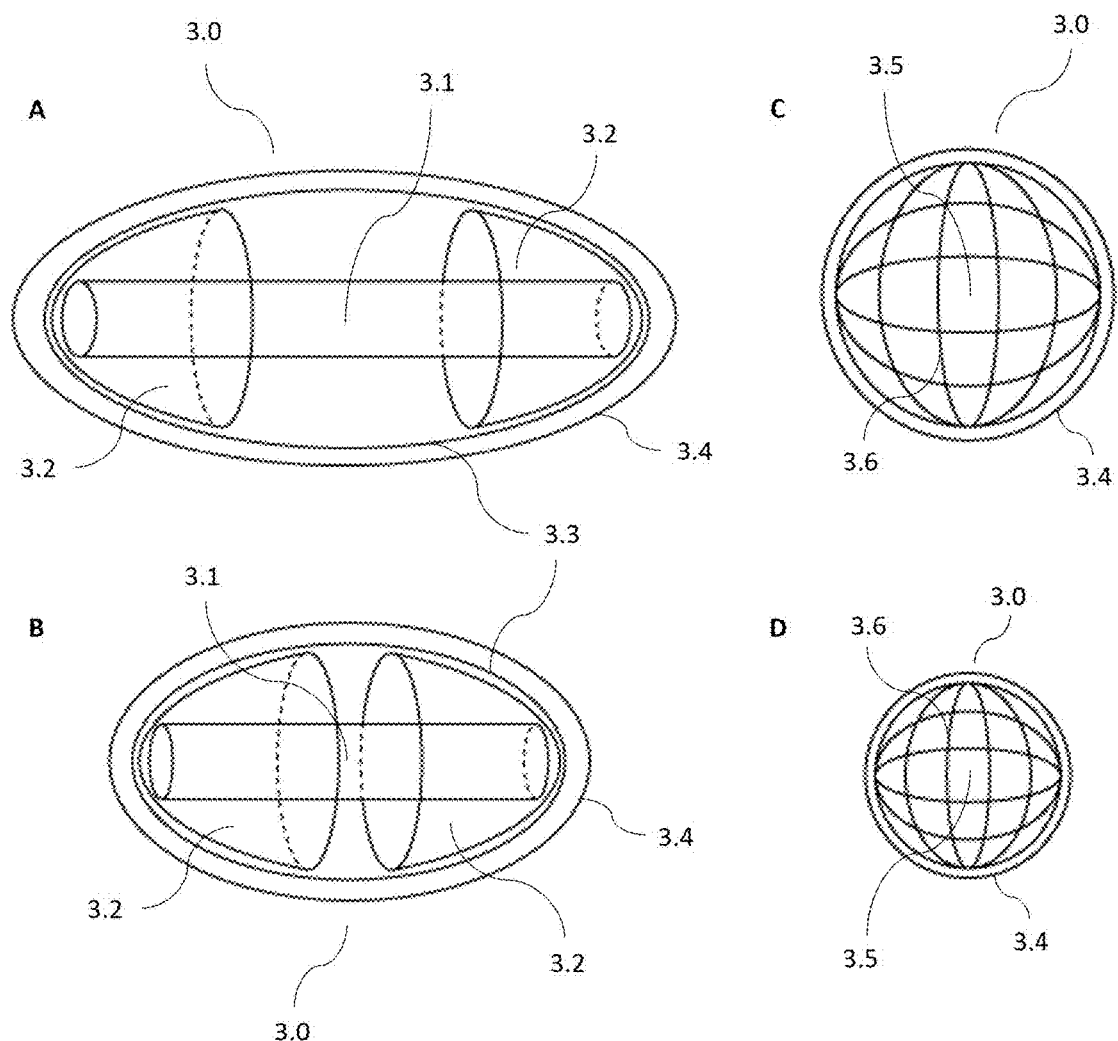
FIG. 3 A schematically shows an embodiment of an expanded buoyancy body (3.0)

FIG. 3A and FIG. 3B show a further embodiment of a buoyancy body (3.0) whose mean density and thus its buoyancy is dependent on a change in temperature. The buoyant body (3.0) comprises a centrally arranged pneumatic element (3.1) whose function is to move the shaped bowls (3.2) apart in order to reduce the mean density of the buoyant body (3.0), thereby increasing its buoyancy. As soon as the buoyancy body (3.0) heats up, a thermoresponsive polymer shell (3.3), which encases the molded bowls (3.2), contracts, whereby the forces exerted by the contraction of the thermoresponsive polymer shell (3.3) counteract those of the pneumatic element. A spring can also be arranged inside the pneumatic element (3.1). The maximum force of the pneumatic element (3.1) is set so that the force of the thermoresponsive polymer shell (3.3) is greater as soon as a transition temperature is reached. By contracting the thermoresponsive polymer envelope (3.3), the average density and thus the buoyancy of the buoyancy body (3.0) is reduced. If the temperature decreases again, the outward force of the pneumatic element (3.1) prevails and the buoyancy increases again. The thermoresponsive polymer shell (3.3) is additionally surrounded by a liquid-repellent shell (3.4) made of a stretchable plastic. A fully compressed buoyancy body has the lowest buoyancy. A fully decompressed buoyancy body has the greatest buoyancy. FIG. 3A shows the decompressed buoyancy body (3.0) and FIG. 3B shows a compressing buoyancy body (3.0).

FIG. 3C and FIG. 3D show a further embodiment of a buoyancy body (3.0). Here, the buoyancy body (3.0) comprises a gas-filled pneumatic hollow body (3.5), which is encased in a thermoresponsive polymer mesh (3.6) and a liquid-repellent sheath (3.4). The functional principle corresponds to that described above, wherein FIG. 3C shows the decompressed buoyancy body (3.0) and FIG. 3D shows the compressed buoyancy body (3.0).

Figure 4:
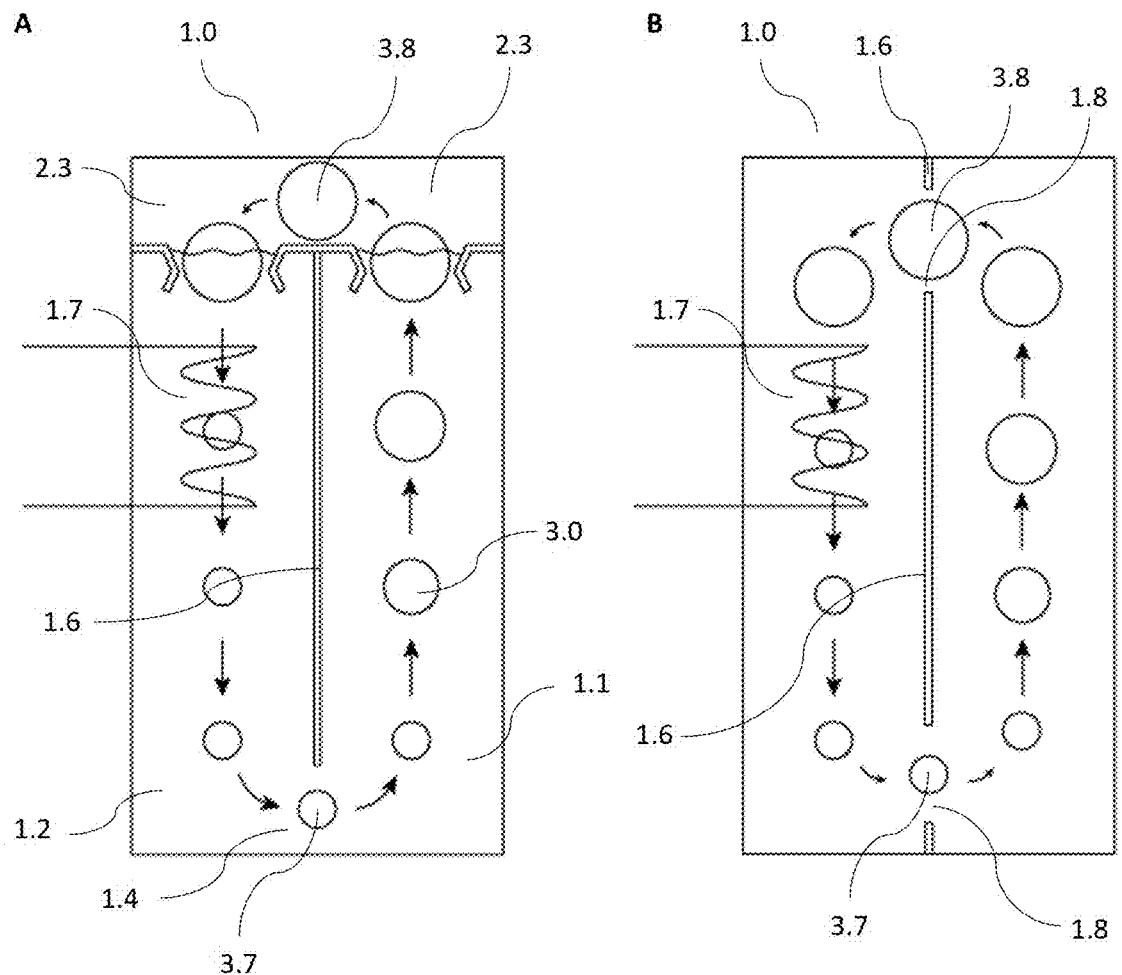
FIG. 4 A schematically shows an embodiment the invention with heat exchanger (1.7)

FIG. 4A shows an embodiment of the buoyant force utilization device (1.0), wherein here buoyancy bodies (3.0) whose average density is temperature-variable as described above are depicted. The endless rail system (not shown here) is designed such that the compressed buoyancy body (3.7) and the decompressed buoyancy body (3.8) are movable within the endless rail system. There is therefore preferably enough clearance between the endless rail system and the buoyancy body so that the decompressed and compressed buoyancy bodies can be guided within the endless rail system. Here, the buoyant force utilization device (1.0) comprises a first space (1.1) and a second space (1.2) separated by an insulating partition wall (1.6), wherein both spaces contain the same medium (here: water). A heat exchanger (1.7) that conducts the waste heat from a biogas plant is arranged in the second space (1.2). The heat exchanger (1.7) causes an increase in the temperature of the buoyancy bodies (3.0) that are being guided through it, are designed as indicated above and reduce their average density. On reaching the lower reversal point (1.4), the buoyancy increases again, causing the buoyancy bodies (3.0) to rise upward. An air space (2.3) is arranged at the upper end of the first space (1.1) and the second space (1.2). This serves as an insulator to minimize heat transfer from the second space (1.2) to the first space (1.1). Converters that convert the kinetic energy of the buoyancy bodies into electrical energy are not shown. FIG. 4B shows a slightly modified embodiment of FIG. 4A, wherein there is no air space here. Instead, the first space (1.1) and the second space (1.2) are separated from each other by an insulating partition wall (1.6), wherein this is designed in such a way as to prevent heat diffusion from the second space (1.2) to the first space (1.1), for example by designing the partition wall openings (1.8) such that minimal water diffusion takes place between the insulating partition wall (1.6) and the buoyancy body (3.0). The partition wall openings (1.8) are one embodiment of a lock system according to the invention.

The sizes of the described components are not shown to scale. In addition, the embodiments of the invention depicted are to be understood in each case as exemplary and not limiting. The invention can also be implemented in ways deviating from these examples. For example, in a further alternative embodiment, flat elements, as well as a capillary bundle and a downpipe, can be omitted. Instead, the piezoelectric fibers can be arranged along a flexible element supported by a balloon filled with buoyant gas.

LIST OF REFERENCE NUMERALS 1.0 Buoyant force utilization device
1.1 First space
1.2 Second space
1.3 Lock system
1.4 Lower reversal point
1.5 Sealing element/lip seal
1.6 Insulating partition wall
1.7 Heat exchanger/heating element
1.8 Partition wall openings
1.9 Upper reversal point
2.1 First medium
2.2 Second medium
2.3 Air space
3.0 Buoyancy body
3.1 Pneumatic element
3.2 Shaped bowls
3.3 Thermoresponsive polymer shell
3.4 Liquid-repelled sheath
3.5 Pneumatic hollow body
3.6 Thermoresponsive polymer mesh
3.7 Compressed buoyancy body
3.8 Decompressed buoyancy body
4.0 Circumferential guide/endless rail system
4.1 First guide rail
4.2 Second guide rail
4.3 Third guide rail
5.0 Profiling

The invention claimed is:

1. A buoyant force utilization device (1.0) for utilizing and converting kinetic buoyancy energy and/or potential energy into mechanical and/or electrical energy, comprising the following components:

a) a first space (1.1) filled with a first medium (2.1),
b) a second space (1.2) filled with a second medium (2.2),
c) multiple buoyancy bodies (3.0),
d) a circumferential guide (4.0), wherein movement of multiple buoyancy bodies (3.0) takes place along the circumferential guide (4.0),
wherein the circumferential guide (4.0) runs through the first space (1.1) and the second space (1.2),
characterized in that the circumferential guide (4.0) comprises an endless rail system,
wherein the first space (1.1) and the second space (1.2) are separated from each other by a lock system (1.3),
wherein the lock system (1.3) has a permanent opening,
wherein a surface of each of the multiple buoyancy bodies (3.0) facing the first medium (2.1) and/or second medium (2.2) comprises a profiling (5.0);
wherein the buoyant force utilization device (1.0) further comprises a heat exchanger (1.7), the heat exchanger (1.7) is disposed in the second space (1.2), the heat exchanger (1.7) is configured to receive an external heat energy and heat each buoyancy body (3.0) in the second medium (2.2) to thereby reduce a buoyancy of each buoyancy body (3.0) in the second medium (2.2) and make each buoyancy body (3.0) in the second medium (2.2) sink in the second medium (2.2) and then pass through the permanent opening of the lock system (1.3) and enter the first medium (2.1), a temperature of the first medium (2.1) is lower than a temperature of the second medium (2.2), a buoyancy of each buoyancy body (3.0) from the second medium (2.2) to the first medium (2.1) is increased and thus rises in the first medium (2.1); and
wherein the first medium (2.1) and the second medium (2.2) are chemically identical;
wherein each of the multiple buoyancy bodies (3.0) is designed as a hollow body, and a material of each of the multiple hollow bodies comprises a metal, a plastic, glass or an organic material;
wherein the hollow body comprises a gas and a polymer, an average density of each of the multiple buoyancy bodies (3.0) is influenced by expansion of the gas and the polymer, and the expansion of the gas and the polymer depends on a change in temperature in the first space (1.1) and/or the second space (1.2); and
wherein the polymer shrinks when heated and expands when cooled.

2. The device of claim 1, wherein the change in temperature is induced in an immediate vicinity of a lower reversal point (1.4) and/or in an immediate vicinity of an upper reversal point (1.9) and/or in an immediate vicinity of the buoyancy body (3.0) in the second space (1.2) by the heat exchanger.

3. The device of claim 1, wherein each of the multiple buoyancy bodies (3.0) comprises: a pneumatic element (3.1), two shaped bowls (3.2), and a thermoresponsive polymer shell (3.3);
wherein the pneumatic element (3.1) and the two shaped bowls (3.2) are arranged in the thermoresponsive polymer shell (3.3); and
wherein when a temperature of the buoyancy body (3.0) is increased, an average density and a buoyancy of the buoyancy body (3.0) is reduced; when the temperature of the buoyancy body (3.0) is reduced, the average density and the buoyancy of the buoyancy body (3.0) is increased.

4. The device of claim 1, wherein each of the multiple buoyancy bodies (3.0) comprises friction-reducing elements to make the buoyancy body (3.0) to move within the endless rail system with minimal friction, and each of the friction-reducing elements is made of a low-friction plastic.

5. The device of claim 1, wherein the permanent opening is designed to fit exactly to a smallest lateral cross-section of each of the multiple buoyancy bodies (3.0).

6. The device of claim 1, wherein the circumferential guide (4.0) comprises a first guide rail (4.1), a second guide rail (4.2) and a third guide rail (4.3), and the first guide rail (4.1), the second guide rail (4.2) and the third guide rail (4.3) are arranged at an angle of 120° to each other.

7. The device of claim 1, wherein each of the first medium (2.1) and the second medium (2.2) is water.

\* \* \* \* \*